United States Patent [19]
Gallet

[11] 3,944,933
[45] Mar. 16, 1976

[54] JAM DETECTION CIRCUIT
[75] Inventor: Jack R. Gallet, Oak Lawn, Ill.
[73] Assignee: Copar Corporation, Oak Lawn, Ill.
[22] Filed: Oct. 7, 1974
[21] Appl. No.: 512,431

[52] U.S. Cl................ 328/5; 250/223 R; 307/231; 307/232; 328/109; 340/259
[51] Int. Cl.² G01N 27/00; G08B 13/16; G08B 21/00
[58] Field of Search........ 307/232, 231; 328/5, 109; 250/223 R, 561; 340/259; 271/158, 159

[56] References Cited
UNITED STATES PATENTS

| | | | |
|---|---|---|---|
| 3,046,538 | 7/1962 | Pedersen | 250/223 R |
| 3,737,159 | 6/1973 | Washio et al. | 340/259 |
| 3,778,629 | 12/1973 | Terryn | 340/259 |
| 3,878,540 | 4/1975 | Kawai | 340/259 |

OTHER PUBLICATIONS
"Jam Detection Circuit" by Wallace, IBM Tech. Discl. Bull., Vol. 8, No. 8, Jan. 1966, pp. 1035–1036.

*Primary Examiner*—Stanley D. Miller, Jr.
*Attorney, Agent, or Firm*—Kinzer, Plyer, Dorn & McEachran

[57] ABSTRACT

A system for detecting a jam condition in a series of sequentially moving members which are passing a plurality of stations. The system finds particular application in the production of corrugated board or the like in which at the first station there may be slitting or slotting or printing drums or the like, which are performing an operation on a series of moving corrugated board members. There are detection means at each station and two successive signals from one station, indicating the presence of a member at that station without a similar signal from the next sequential station, will cause a jam signal to be provided by the circuit.

5 Claims, 2 Drawing Figures

JAM DETECTION CIRCUIT

SUMMARY OF THE INVENTION

The present invention relates to a jam control system for use in detecting jam-ups in a machine processing a series of sequentially moving members.

Another purpose is a jam control circuit of the type described utilizing a plurality of simple and inexpensive bistable circuits.

Another purpose is a jam control system for use in a machine which is slotting, cutting or printing corrugated board or the like.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
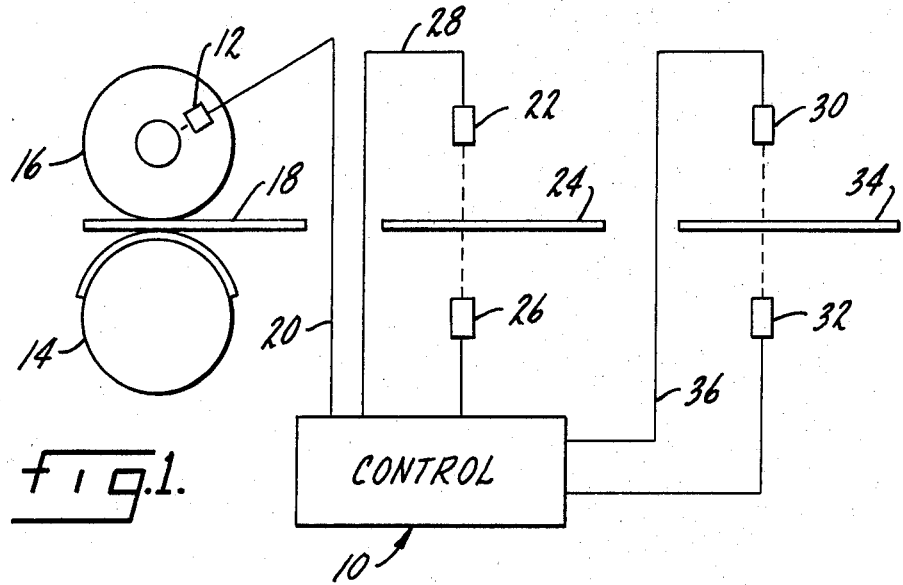
FIG. 1 is a diagrammatic illustration of a machine of the type described.

In FIG. 1, the control circuit is indicated diagrammatically at 10 and is connected to a first detector 12 positioned adjacent a pair of slotting drums 14 and 16 which rotate in the conventional manner to slot a blank 18. The blank may be corrugated board or the like, although the invention should not be limited to this application. In like manner, the drums 14 and 16 may be printing drums rather than slotting drums. In any event, the detector 12 which, as shown herein, is a magnetic pickup, but could be a proximity device, photo-electric device or the like, provides a signal each time a blank is processed by the drums 14 and 16. The detector 12 is connected by line 20 to the control circuit 10.

The drums described above are the first station in the particular series of stations controlled by the circuit 10, with the second station having a photo-electric cell 22 on one side of a blank 24 and a light source 26 on the opposite side. Thus, whenever the light beam between source 26 and cell 22 is broken, indicating the presence of a blank, a signal will be sent via line 28 to the control 10.

In like manner, there may be a third station utilizing a photo-electric cell 30 and a light source 32 on opposite sides of a moving blank 34 so as to provide a control signal via line 36 to the circuit 10.

The blanks are shown in a diagrammatic manner and it should be understood that conventionally there will be a conveyor or some other belt-type means which will move the blanks from station to station. There may be operations performed at each station, or at only the first station. In like manner, the invention should not be limited to any particular type of detection means at any particular station, although a magnetic pickup at the first station and photo-electric pickups at succeeding stations have been found to provide a satisfactory method of operation.

Figure 2:
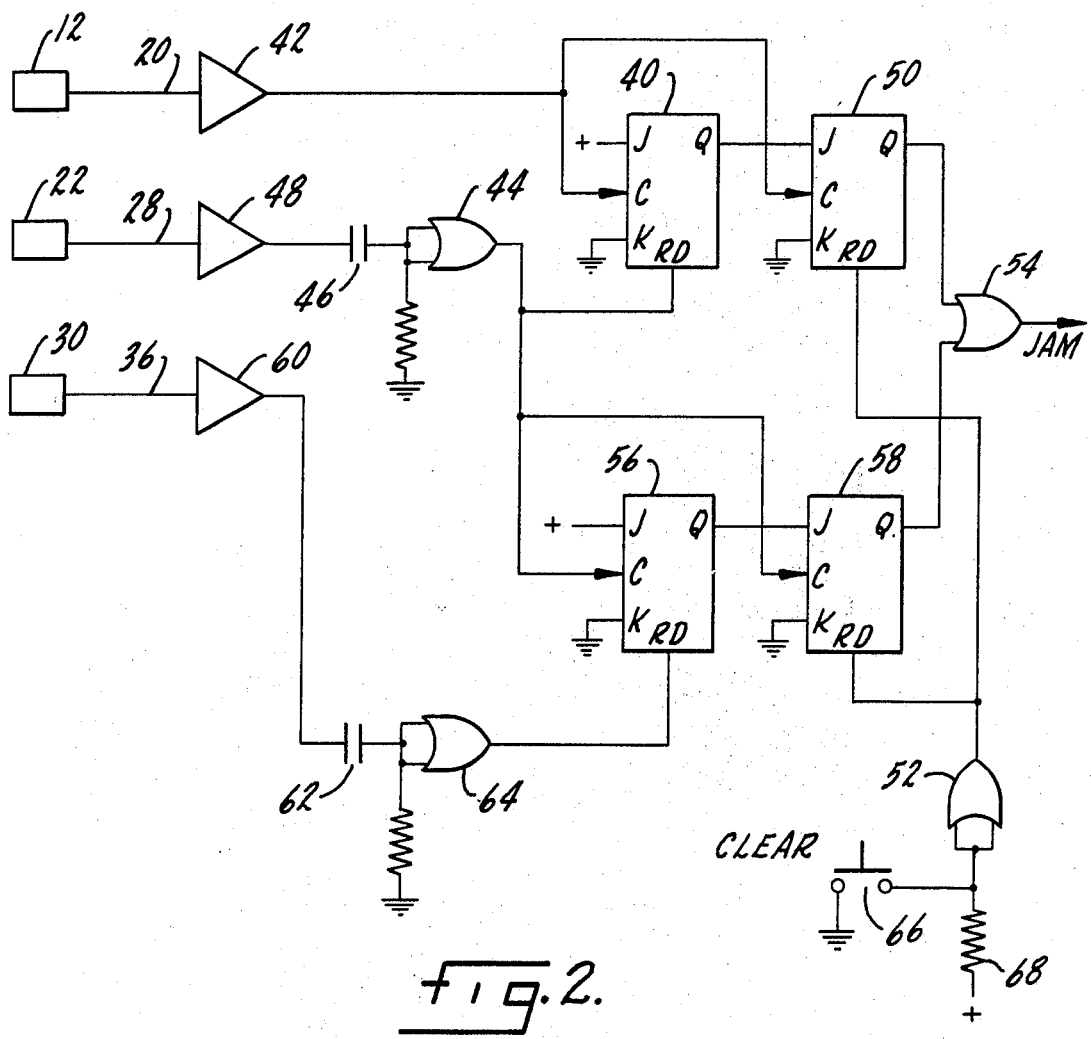
FIG. 2 is a block diagram of the control circuit.

In FIG. 2, a first bistable circuit, which may be a J/K flip-flop is indicated at 40 and has its C input connected through an amplifier 42 to line 20 and detector 12. The J input of bistable 40 has a positive voltage applied to it and the K input is connected to ground. The reset input of bistable 40 is connected through an OR gate 44 and a capacitor 46 to an amplifier 48 which in turn receives an input from photo-electric cell 22 by line 28.

The Q input from bistable 40 is connected to a second bistable 50, again a J/K flip-flop as are all of the bistables shown herein. The C input for bistable 50 is also connected to amplifier 42 and thus detector 12. Again, the K input is connected to ground. The reset input for bistable 50 is connected to a gate 52 which will be explained hereinafter. The Q output of bistable 50 is connected to a gate 54 which will provide an output signal indicative of a jam condition as described hereinafter.

A second pair of bistable circuits indicated at 56 and 58 are connected in the same manner described above. The C inputs for bistables 56 and 58 are connected to gate 44 and thus to photoelectric cell 22. The K inputs are each connected to ground, with the J input of bistable 56 having a positive voltage and the J input of bistable 58 being connected to the Q output of bistable 56. The Q output of bistable 58 is connected to OR gate 54, again to provide a jam signal indication.

Photo-electric cell 30 is connected through an amplifier 60, a capacitor 62 and a gate 64 to the reset input of bistable 56. The reset input of bistable 58 is connected to gate 52.

A clearing signal is provided by the operation of switch 66, with one terminal of the switch being connected to ground and the other terminal being connected to a resistor 68, the bottom side of which is connected to a source of positive voltage. Thus, upon operation of switch 66, a signal at ground potential will be applied through gate 52 to the reset inputs of bistables 50 and 58.

In operation, a signal from detector 12 indicating that a blank is present at the first station causes bistable 40 to be set in a certain condition to provide an output at its Q terminal. Assuming there is no jam condition, as the blank from the first station moves to the second station, its presence will be detected by cell 22 which will then provide a signal to the reset input of bistable 40, thus causing the bistable to return to its original condition. The next signal from detector 12 will again provide an output at the Q terminal of bistable 40 and, assuming there is sequentially an output from cell 22, the bistable will be returned to its original condition and there will be no output at the Q terminal of bistable 50.

The same series of events will take place at bistables 56 and 58. Bistable 56 will be set to provide an output at its Q terminal when a blank is detected by cell 22 and the subsequent detection of that blank by cell 30 will cause bistable 56 to be returned to its original condition.

In the event that detector 12 provides a signal indicating that a blank has been processed at the first station, and there is no signal from cell 22 to clear bistable 40, when the next blank is processed at the first station and a signal is provided by detector 12, there will be inputs at the J and C terminals of bistable 50 which will provide an output at its Q terminal, indicating a jam condition. In like manner, bistables 56 and 58 will provide an output at the Q terminal of bistable 58 in the event bistable 56 has not been cleared by a signal from detector 30 after indication of a blank at the second station by detector 22.

Thus, the basic detector circuit includes a pair of bistables which are so arranged that the first blank places the first bistable into predetermined condition and that bistable must be returned to its original condition by the first blank passing the second station. If this does not take place, then the detection of a second blank at the first station will cause the second bistable to provide an output signal indicative of a jam condition.

Although the invention has been described in connection with a certain type of bistable circuit, obviously the invention should not be so limited. In like manner, the invention should not be limited to any particular application, i.e. corrugated boards or the like, nor to any particular type of detection means.

Whereas the preferred form of the invention has been shown and described herein, it should be realized that there may be many modifications, substitutions and alterations thereto.

The embodiments of the invention in which an exclusive property or privilege is claimed are as follows:

1. A system for use in detecting jams in a series of members which are sequentially moving through predetermined spaced fixed stations, there being an operation performed on said members in at least one of said stations, said system including detection means at each station providing an output signal indicating the presence or absence of a member at the station,
   a first bistable circuit having an input connected to the detection means at a first one of said stations and a reset input connected to the detection means at a second one of said stations, a second bistable circuit having an input connected to the detection means at said first one of said stations and an output providing a signal indicating a jam condition, said first bistable circuit having an output connected to an input of said second bistable circuit, with simultaneous inputs at said second bistable circuit causing an output indicative of a jam condition.

2. The system of claim 1 further characterized by and including reset means for the second bistable.

3. The system of claim 1 further characterized by and including a second pair of bistable circuits, the first bistable of said second pair having an input connected to detection means at said second station and an output connected to the input of the second bistable of said second pair, a reset input for the first bistable of said second pair connected to the detection means at a third station, the second bistable of said second pair having a second input connected to the detection means at said second station, and an output for the second bistable of said second pair, said output providing a signal indicative of a jam condition.

4. The system of claim 3 further characterized by and including reset means connected to the second bistables of said first and second pairs of bistables.

5. A system for use in detecting jams in a series of members which are sequentially moving through predetermined fixed stations, there being an operation performed on said members in at least one of said stations, said system including detection means at each station providing an output signal indicating the presence or absence of a member at the station,
   first circuit means having one input connected to the detection means at a first one of said station, and a reset input connected to the detection means at a second one of said stations, an output for said first circuit means providing a signal when said first circuit means receives a signal from the detection means at said first station indicating the presence of a member,
   a second circuit means, substantially identical with said first circuit means, and including a first input connected to the detection means at said first one of said stations, and a second input connected to the output of said first circuit means, said second circuit means having an output, providing a signal indicative of a jam condition, when there is a signal at each of its inputs.

\* \* \* \* \*